United States Patent [19]
Chitre et al.

[11] 3,896,385
[45] July 22, 1975

[54] METHOD AND INSTRUMENT FOR MEASURING INTERFERENCE BETWEEN ANGLE MODULATED SYSTEMS
[75] Inventors: Nand Kishore M. Chitre, Rockville; Benjamin Anthony Pontano, Gaithersburg, both of Md.
[73] Assignee: COMSAT, Washington, D.C.
[22] Filed: Jan. 29, 1974
[21] Appl. No.: 437,562

[52] U.S. Cl. ............................................. 325/363
[51] Int. Cl. ............................................. H04b 1/00
[58] Field of Search ......... 325/363, 65, 472, 47, 67; 324/77 B, 77 D

[56] References Cited
UNITED STATES PATENTS
3,691,467  9/1972  Mansfield et al. ................. 325/363

*Primary Examiner*—George H. Libman
*Attorney, Agent, or Firm*—Sughrue, Rothwell, Mion, Zinn & Macpeak

[57] ABSTRACT

The interference component resulting from the interference between two angle modulated carriers is obtained without loading the desired carrier. The interfering carrier is equivalently loaded with a baseband signal that is the difference between first and second baseband signals. The equivalently loaded interfering carrier is combined with the unmodulated desired carrier. The interference component resulting from interference with the equivalently loaded interfering carrier is the same as would occur had both carriers been separately loaded with the first and second baseband signals, respectively. The desired carrier is then demodulated to obtain the interference component.

8 Claims, 10 Drawing Figures

FREQUENCY
ACTUAL INTERFERENCE CONFIGURATION $\phi_T = \phi_2(t) - \phi_1(t)$

FREQUENCY
EQUIVALENT LOADING CONFIGURATION 3,896,385

1

METHOD AND INSTRUMENT FOR MEASURING INTERFERENCE BETWEEN ANGLE MODULATED SYSTEMS

BACKGROUND OF THE INVENTION

The invention is in the field of measuring and testing systems and methods, and in particular is an apparatus and method for obtaining a measure of the interference resulting from two angle modulated carriers.

An angle modulated carrier, whether in the context of telephony or video communications, is a carrier which is either frequency modulated or phase modulated by a modulation signal. In telephony, the modulating signal or baseband modulation may be a composite of a plurality of amplitude modulated frequency separated sub-carriers. In video communications the baseband modulation is the video signal.

As is well known, R.F. signals which are not sufficiently separated in frequency, will interfere with each other causing distortion in the desired demodulated baseband. With the ever increasing use of the radio spectrum, it becomes necessary for communications engineers to design systems which will efficiently utilize the R.F. spectrum. Maximum utilization of the R.F. spectrum becomes possible only when accurate interference models or means of predicting interference are available.

When considering interference between angle modulated signals, it has been difficult to obtain accurate measurements of interference. This is due to the fact that the interference is a function of both the desired baseband and the baseband on the interfering carrier. If the desired and interfering carriers are modulated with the respective baseband signals, the demodulation of the desired carrier will result in a baseband signal which comprises the desired baseband and the interference component. Where the interference component overlaps the desired baseband in frequency, the interference component will be effectively masked on any oscilloscope display of the demodulated signal. Thus, this technique will not give an accurate measurement of display of the interference component.

One unsatisfactory technique which has been attempted is to combine the unmodulated desired carrier with a baseband modulated interfering carrier and to demodulate the desired carrier. The resulting demodulated signal is obviously the result of interference, but it is not an accurate representation of the interference component which would have occurred had the desired carrier been modulated with a baseband signal.

In the case of frequency division multiplexed/frequency modulated (FDM/FM) telephony, a standard NPR white noise test set may be used for the purpose of obtaining a reasonably accurate representation of the interference component. The interference is measured in a series of selected baseband channels by notching out the corresponding slots in the transmitside baseband. For the case of a video baseband signal, no measurement technique has previously been devised which accounts for the baseband loading on the desired carrier.

SUMMARY OF THE INVENTION

In accordance with the present invention, a method and apparatus is provided for obtaining an interference component which accurately represents the interference between a baseband modulated desired carrier

2 and a baseband modulated interfering carrier. The invention is based upon a discovery by applicants. The discovery, which came about through analysis and testing, is that the interference component caused by interference between a desired carrier modulated by a baseband signal $\phi_1(t)$ and an interfering carrier modulated by a baseband signal $\phi_2(t)$ can be accurately obtained and isolated by the following procedure:

1. angle modulate the interfering carrier with the baseband signal: $\phi_2(t) - \phi_1(t)$;
2. combine the modulated interfering carrier with the unmodulated desired carrier; and
3. demodulate the desired carrier.

The resulting demodulated signal is an accurate representation of the interference component without masking by the desired baseband component.

The technique of step number one above is referred to herein as "equivalent loading" of the interfering carrier.

DETAILED DESCRIPTION OF THE PREFERRED EMBODIMENTS

The approach of the present invention is based on a special property of interference between angle-modulated carriers: the baseband interference produced when both carriers are modulated is identical to that produced when only the interfering carrier is modulated by the difference of the two modulating signals. Since the technique eliminates the demodulated desired signal, it permits direct measurement of the interference.

Figure 1:
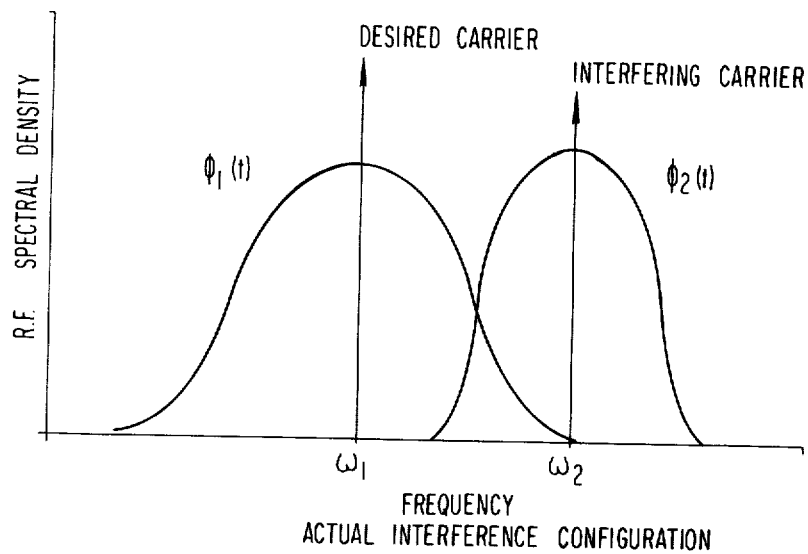
FIG. 1 is a graph of a typical interference configuration between angle modulated carriers.
Figure 2:
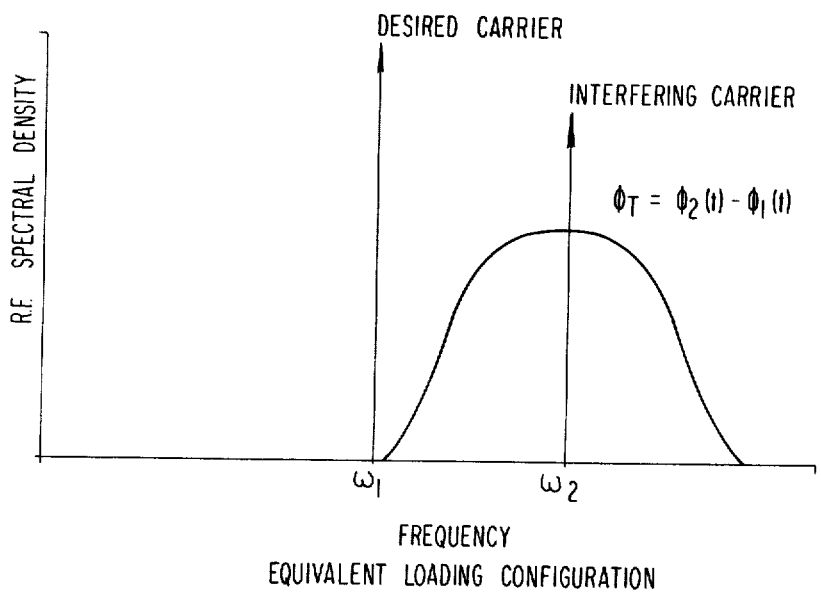
FIG. 2 is a graph of the spectrum of an equivalently loaded interference carrier.

A typical interference configuration is considered in FIG. 1 in which the actual loading on the desired and interfering carriers $\omega_1$ and $\omega_2$, respectively, is given by $\phi_1(t)$ and $\phi_2(t)$, respectively. The loading on the desired carrier may be removed if an "equivalent loading"[$\phi_T(t)$] is placed on the interfering carrier, as shown in FIG. 2. The equivalent loading is shown below to be equal to the difference in loading on the interfering and desired carriers:

$\phi_T(t) = \phi_2(t) - \phi_1(t)$.

Consider that the desired modulated carrier is given by:

$v_1(t) = Re \{A_1 \exp j [\omega_1 t + \phi_1(t)]\}$
$= Re\ Z_1(t)$ (1)

and the interfering modulated carrier is given by:

$v_2(t) = Re \{A_2 \exp j [\omega_2 T + \phi_2(t) + \Delta\mu]\}$ (2)

where:

$A_1$ = amplitude of unmodulated desired carrier voltage $A_2$ = amplitude of unmodulated interfering carrier voltage $\omega_1$ = frequency of unmodulated desired carrier (radians/sec)

$\omega_2$ = frequency of unmodulated interfering carrier (radians/sec)

$\Delta\mu$ = arbitrary initial phase angle
$\phi_1(t)$ = desired carrier modulating signal
$\phi_2(t)$ = interfering carrier modulating signal.

The phase angle that would be detected by an ideal angle demodulator is given by the following: See B. A. Pontano, J. C. Fuenzalida and N. K. M. Chitre, "Interference Into Angle Modulated Systems Carrying Multichannel Telephony Signals," IEEE Transactions on Communications, COM-21, No. 6, June 1973, pp. 714-727.

$$\lambda(t) = Im \ln\left\{1 + \frac{Z_2(t)}{Z_1(t)}\right\} \quad (3)$$

$$= Im \ln\left\{1 + \frac{A_2}{A_1}\exp j\left[(\omega_2 - \omega_1)t + \phi_2(t) - \phi_1(t) + \Delta\mu\right]\right\} \quad (4)$$

where:
$Im\ x$ is the imaginary part of the complex variable $x$.

If the interfering carrier is modulated instead with $\phi_2(t) - \phi_1(t)$, i.e., the "equivalent loading", while the desired carrier is left unmodulated, then the desired unmodulated carrier is given by:

$$v_1(t) = Re\{A_1 \exp j\ \omega_1 t\} \quad (5)$$

and the modulated interfering carrier is thereby:

$$v_2(t) = Re\{A_2 \exp j\ [\omega_2 t + \phi_2(t) - \phi_1(t) + \Delta\mu]\} \quad (6)$$

Thus the resulting interference as given by equation (3) becomes:

$$\lambda(t) = Im \ln\{1 + \frac{A_2}{A_1}\exp j[(\omega_2 - \omega_1)t + \phi(t) - \phi_1(t) + \Delta\mu]\} \quad (7)$$

which is identical to that of equation (4). Hence, the technique of equivalent loading gives identical interference components as those obtained when each carrier is loaded. Since the desired carrier when using this technique is not modulated, the desired signal is completely eliminated.

The configuration of FIG. 2 produces identical baseband interferences as that when both carriers are loaded. Since the desired signal is no longer present, direct measurement of the baseband interference is now possible.

Figure 3:
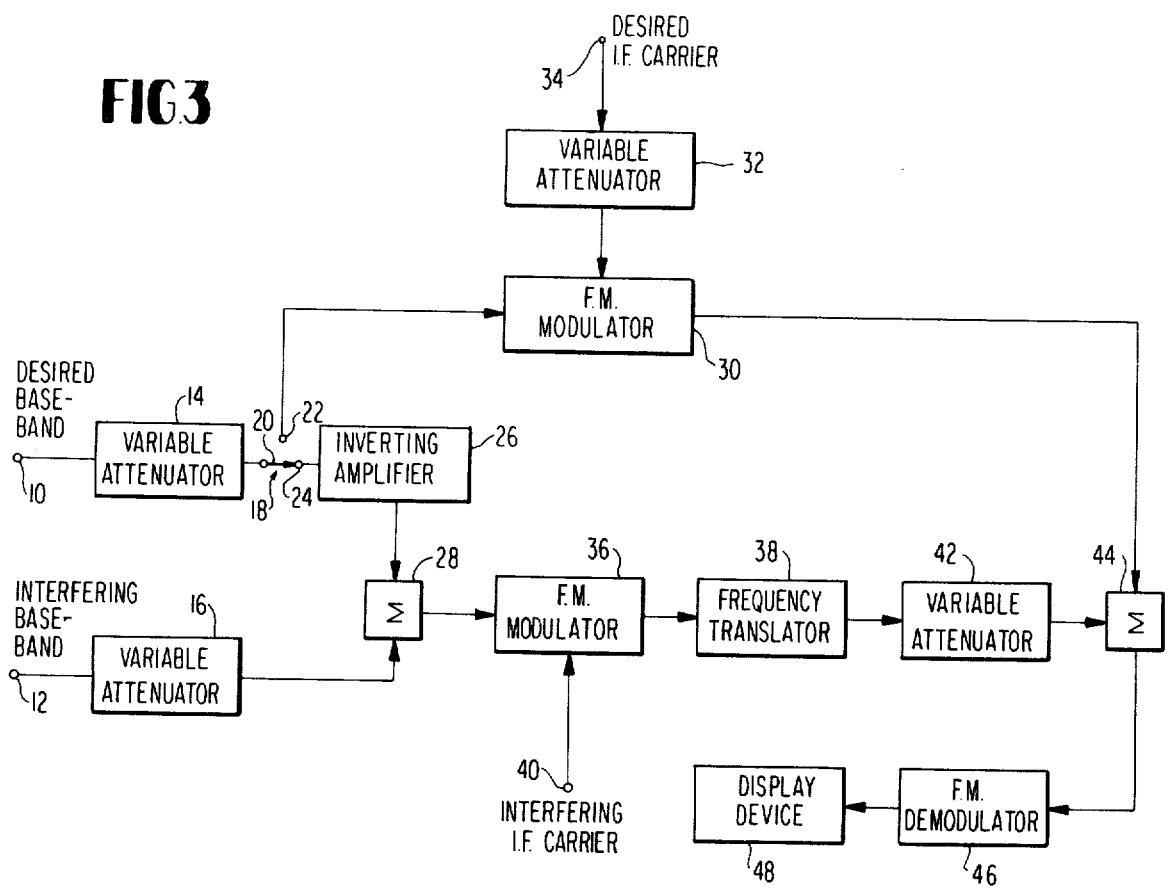
FIG. 3 is a block diagram of a preferred embodiment of the present invention.

A block diagram of the preferred embodiment of the invention is illustrated in FIG. 3. The device illustrated obtains a representation of the interference component which would occur if a baseband, $\phi_2(t)$, modulated interfering carrier interfered with a baseband $\phi_1(t)$, modulated desired carrier. The baseband signals, the carriers, and their relative amplitudes can be changed to obtain a plurality of measurements.

A desired baseband signal is applied at terminal 10 to a variable attenuator 14, whose output is applied via a switch 18 to an inverting amplifier 26. The output of the inverting amplifier 26 is applied as one input to a summation means 28. An interfering baseband signal is applied at terminal 12 to a variable attenuator 16 whose output is applied as a second input to the summation means 28. The output from the summation means 28 is the difference between the two baseband signals and is applied to the modulation input of an angle modulator 36. In the specific example shown, the angle modulator is an FM modulator but it will be understood that it can be a phase modulator.

The interfering I.F. carrier is applied at terminal 40 to the carrier input of FM modulator 36 wherein the carrier is frequency modulated by the baseband difference signal. The "equivalently loaded" interfering carrier from modulator 36 is applied to a frequency translator 38 which may be included for the purpose of effectively varying the frequency separation between the interfering carrier and the desired carrier without varying the modulation. The translator output is applied through a variable attenuator 42 to a high frequency summation means 44.

The desired I.F. carrier is applied at terminal 34 to a variable attenuator 32 whose output is applied to the carrier input of an angle modulator 30. In the specific example shown, the angle modulator 30 is an FM modulator, but it will be understood that the angle modulator can be a phase modulator. For the position of switch 18 illustrated in FIG. 3, the modulator 30 will not receive a modulating input and therefore the desired I.F. carrier will appear unmodulated at the modulator output. The unmodulated desired carrier is applied as the second input to high frequency summation means 44.

In the output of the summation means 44 the desired carrier will be modulated by the interference component. The latter signal is demodulated in an FM demodulator 46 which is tuned to the desired I.F. carrier. The resulting output from the demodulator represents the interference component and is applied to a display device which preferably is an oscilloscope or a video monitor.

By altering the position of switch 18 so that switch arm 20 contacts terminal 22, the respective baseband signals at terminals 10 and 12 will frequency modulate the desired and interfering carriers, and the resultant signal applied to the display device 48 will be the desired baseband plus the interference component.

Laboratory measurements of baseband interference spectra made using a system such as illustrated in FIG. 3 support the analysis above which indicates that "equivalent loading" results in the interference component alone. The results of these measurements are given below for both the cases of white noise loading and video test signal loading.

Figure 4:
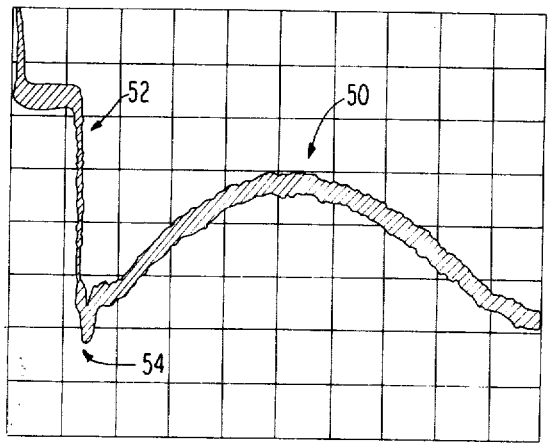
FIGS. 4–10 are drawings of photographs of an oscilloscope display used in conducting tests of the subject invention.

In the first case, standard white noise generators were used as the two baseband signals, and the two carriers were separated in center frequency by 2.5 MHz. The display device used was an oscilloscope with the horizontal and vertical scales set respectively at 0.5 MHz/Division and 10dB/Division. FIG. 4 shows the display read out for the case where both carriers were loaded with white noise modulation, i.e., switch arm 20 of FIG. 3 connected to terminal 22. The portion of the spectrum shown at 52 represents the desired baseband signal; the portion shown at 50 represents the interference component; and the portion at 54 is where the interference component and the desired baseband overlapped in frequency.

Figure 5:
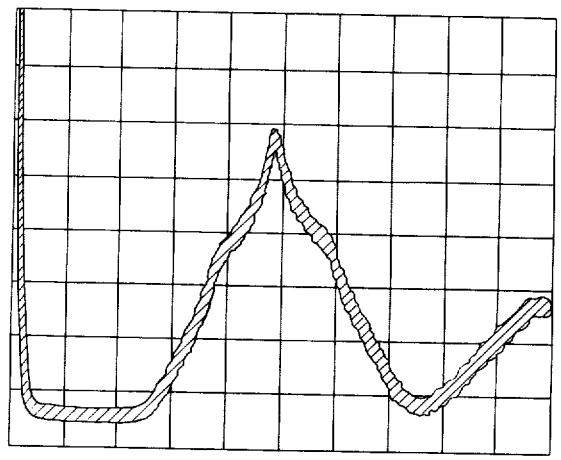

The display in FIG. 5 illustrates the inaccuracy of the prior technique of simply unloading the desired carrier. This display was generated by modulating the interfering carrier with white noise and combining it with an modulated desired carrier (i.e., no baseband signal applied to terminal 10). As can be easily seen by comparing FIGS. 4 and 5, the resulting component obtained by using this old technique is very dissimilar to the interference component 50 shown in FIG. 4.

Figure 6:
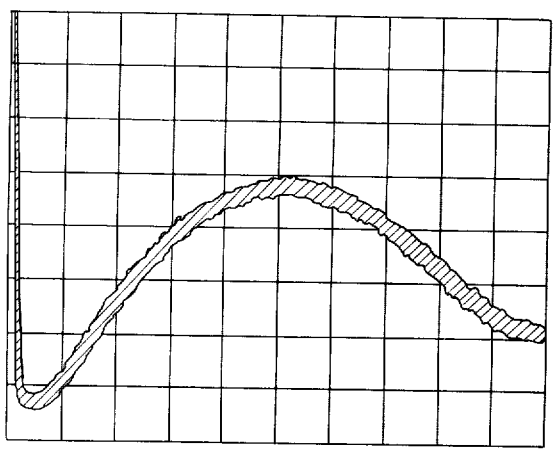

When the equivalent loading technique was used, i.e., white noise applied to terminals 10 and 12, and switch arm 18 connected to terminal 24, the resultant display was as shown in FIG. 6. The spectrum displayed is the interference component without the desired baseband.

Figure 7:
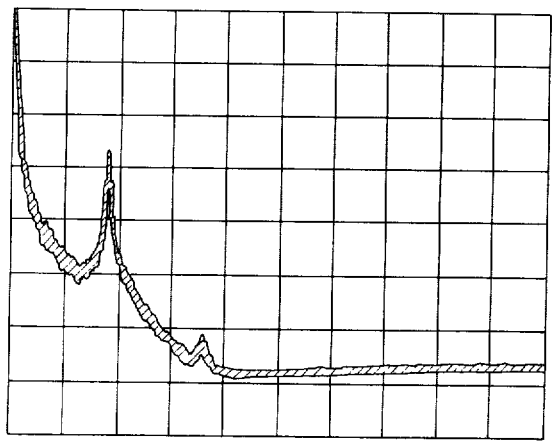
Figure 8:
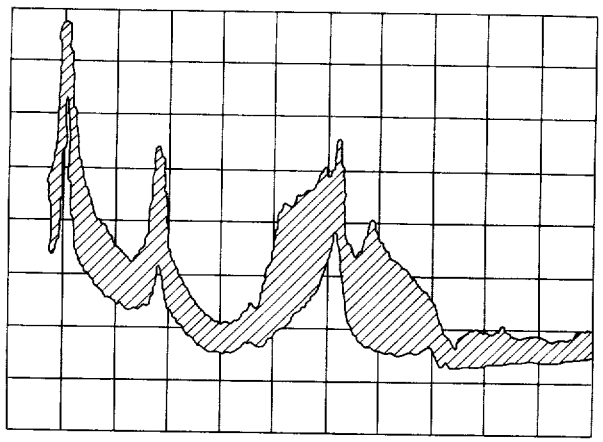
Figure 9:
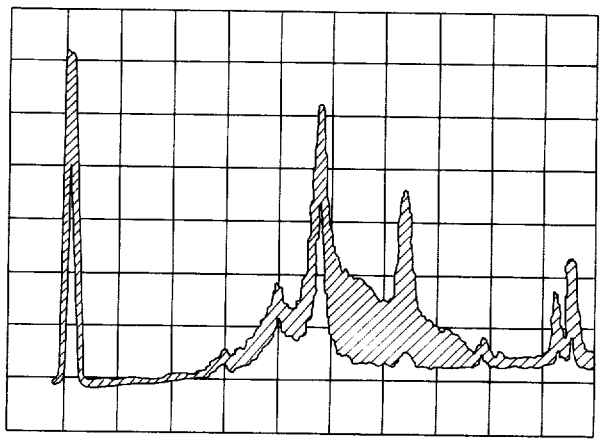

FIGS. 7 through 10 show spectrum displays for a second test wherein video signals were used as the baseband signals. For this test the two carriers differed in frequency by 10 MHz, and the oscilloscope horizontal and vertical settings were 2 MHz/Division and 10dB/Division, respectively. FIG. 7 shows the spectrum of the desired baseband alone, i.e., no interfering carrier. FIG. 8 shows the spectrum resulting where both carriers were loaded with their respective baseband signals. FIG. 9 shows the results of the prior technique where the baseband modulated interfering carrier is combined with the unmodulated desired carrier. By comparing FIGS. 7, 8 and 9, it can be appreciated that FIG. 9 is not an accurate representation of the interference component.

Figure 10:
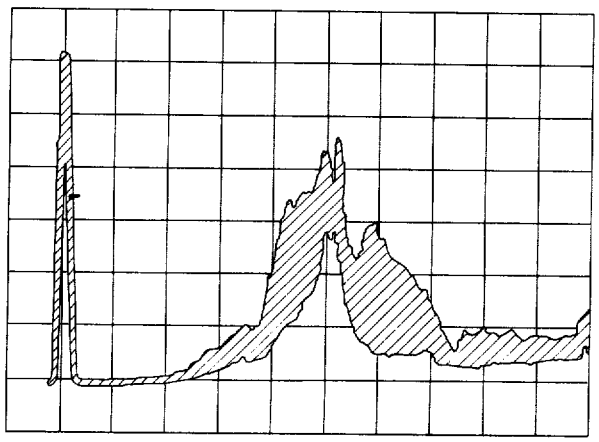

FIG. 10 represents the spectrum resulting from the equivalent loading technique. The spectrum represents the interference component alone. By comparing FIGS. 7, 8 and 10, one can see that the results of this test support the mathematical analysis above.

The equivalent loading technique of interference measurement has been shown to produce identical baseband interference as that obtained when both carriers remain loaded. The technique provides a direct means of measuring baseband interference and is applicable for use with both telephony and video basebands.

It will also be noted that the carriers are I.F. carriers rather than R.F. carriers. However, this distinction exists only because it is not necessary to up convert the carriers to R.F. carriers from I.F. carriers where one is only interested in measuring the interference component. The measurement does not require actual transmission to a distance via electromagnetic waves, and the interference component would not be altered by up converting the I.F. carriers to R.F. carriers with the same carrier separation.

While the invention has been particularly shown and described with reference to a preferred embodiment thereof, it will be understood by those skilled in the art that various changes in form and details may be made therein without departing from the spirit and scope of the invention.

What is claimed is:

1. A method of measuring the interference component resulting from an interfering carrier angle modulated with baseband $\phi_2(t)$ interfering with a desired carrier angle modulated with baseband $\phi_1(t)$ comprising the steps of
   a. angle modulating said interfering carrier with a baseband $\phi(T)$ where $\phi(T) + \phi_2(t) - \phi_1(t)$,
   b. combining said angle modulated interfering carrier with said desired carrier, unmodulated, and
   c. demodulating said desired carrier.

2. The method as claimed in claim 1 further comprising displaying the spectrum resulting from the demodulation of said desired carrier.

3. The method as claimed in claim 2 wherein the step of angle modulation comprises frequency modulation.

4. Apparatus for obtaining a spectrum representing the interference component which would result from interference between two baseband angle modulated carriers, comprising
   a. means responsive to two input baseband signals for forming a third baseband signal which is the difference between the first and second baseband signals,
   b. means for angle modulating a first carrier frequency with said third baseband signal,
   c. means for summing said angle modulated first carrier with an unmodulated second carrier frequency,
   d. angle demodulator means responsive to the output of said summing means for angle demodulating said second carrier frequency, and
   e. read out means responsive to the output from said angle demodulator for reading out the resulting interference component.

5. Apparatus as claimed in claim 4 wherein said readout means is a visual display means.

6. Apparatus as claimed in claim 4 wherein said angle modulation means and said angle demodulation means are a frequency modulator and demodulator respectively.

7. Apparatus as claimed in claim 4 further comprising attenuator means for varying the relative powers of said two basebands and said unmodulated carrier.

8. Apparatus as claimed in claim 4 wherein said means for forming said third baseband signal comprises,
   a. a first variable attenuator adapted to receive and attenuate said first baseband signal,
   b. a second attenuator adapted to receive and attenuate said second baseband signal,
   c. an inverting means connected to said second attenuator for inverting said attenuated second baseband signal, and
   d. second summing means connected to the outputs of said first attenuator means and said inverting means for summing said outputs.

* * * * *

UNITED STATES PATENT OFFICE
CERTIFICATE OF CORRECTION

PATENT NO. : 3,896,385
DATED : July 22, 1975
INVENTOR(S) : NAND KISHORE M. CHITRE ET AL It is certified that error appears in the above-identified patent and that said Letters Patent are hereby corrected as shown below:

IN THE SPECIFICATION:

Column 3

Line 33, delete " $A_2 \atop A_1$ " and insert -- $\frac{A_2}{A_1}$ --

IN THE CLAIMS:

Column 6

Line 3, delete "+" and insert -- = --

Signed and Sealed this fourteenth Day of October 1975

[SEAL]

Attest:

RUTH C. MASON
Attesting Officer

C. MARSHALL DANN
Commissioner of Patents and Trademarks